Oct. 30, 1962 L. G. SIMJIAN 3,061,143
ARTICLE VENDING MACHINE
Filed June 18, 1959 3 Sheets-Sheet 1
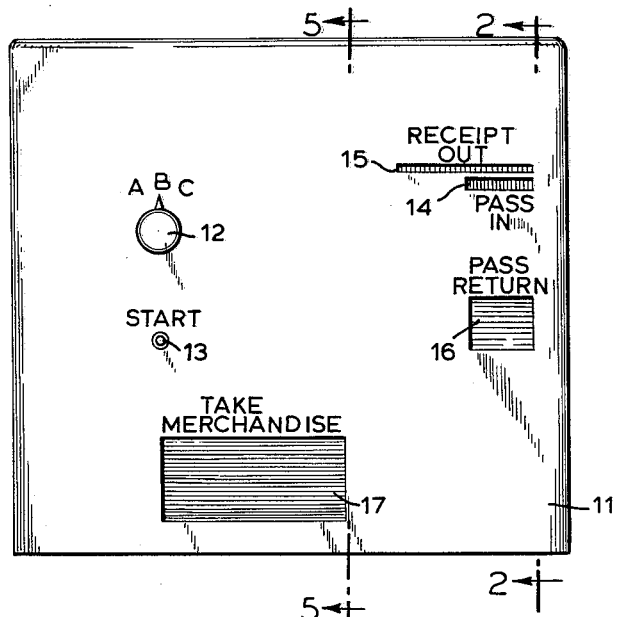
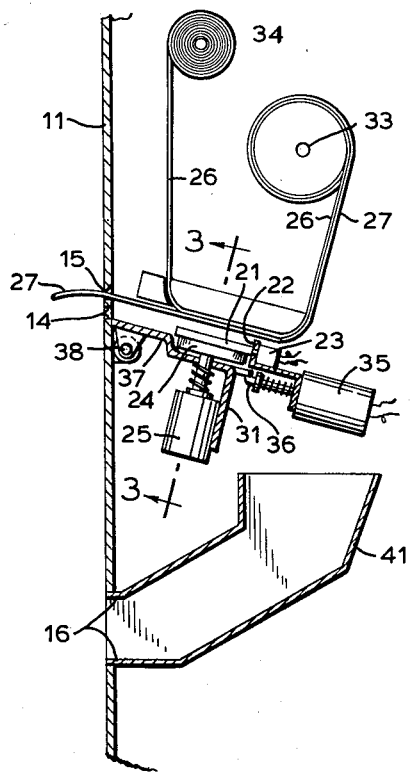
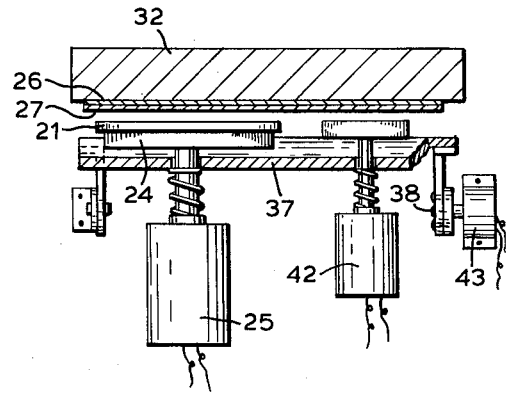
INVENTOR.
LUTHER G. SIMJIAN
BY
Ervin B. Steinberg
AGENT.

Oct. 30, 1962     L. G. SIMJIAN     3,061,143
ARTICLE VENDING MACHINE

Filed June 18, 1959     3 Sheets-Sheet 2

INVENTOR.
LUTHER G. SIMJIAN
BY
Ervin B. Steinberg
AGENT.

Oct. 30, 1962 L. G. SIMJIAN 3,061,143
ARTICLE VENDING MACHINE
Filed June 18, 1959 3 Sheets-Sheet 3
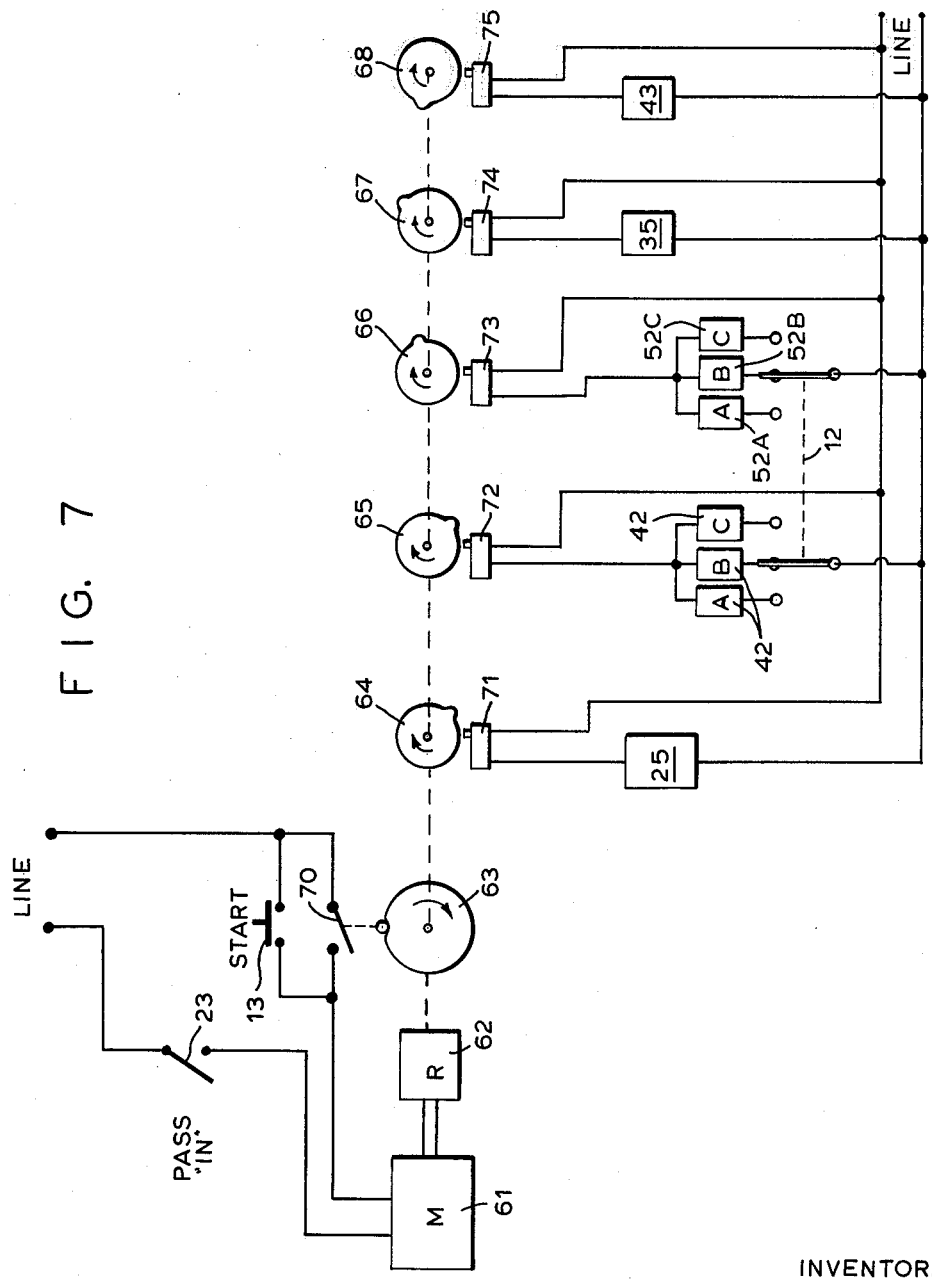
INVENTOR.
LUTHER G SIMJIAN
BY
Ervin B. Steinberg
AGENT.

United States Patent Office 3,061,143
Patented Oct. 30, 1962

3,061,143
ARTICLE VENDING MACHINE
Luther G. Simjian, Greenwich, Conn., assignor to Universal Match Corporation, Ferguson, Mo., a corporation of Delaware
Filed June 18, 1959, Ser. No. 821,252
3 Claims. (Cl. 221—2)

This invention is related to a vending machine which dispenses an article in response to certain manipulations. More specifically, the invention concerns a vending machine which is operable in conjunction with identification or pass means and includes means for rendering a record of the identification means so that subsequent accounting and billing may be accomplished. In this manner, articles are vended in response to proper use of pass or identification means, particularly of cards commonly known as credit cards, thereby obviating the need for the purchaser to carry exact amounts of change money. Hence, the present machine is adapted to vend merchandise whose price exceeds the ordinary nickel, dime and quarter range and whose value will be invoiced at a later date.

The article vending machine described hereafter is suited for installation in offices, clubs, associations and similar organizations where credit privileges are extended in the usual course of business or as a matter of courtesy.

One of the objects of this invention, therefore, is the provision of a new and improved vending machine.

Another object of this invention is the provision of a vending machine operable in conjunction with identification means.

Another object of this invention is the provision of a vending machine operable in conjunction with identification means whereby the identification means are used to provide a record of the vending transaction.

Another object of this invention is the provision of a vending machine which is operable with commonly known credit cards so as to obviate the need for coin money and permitting also the vending of articles of any desired value.

A further object of this invention is the provision of a vending machine operable in conjunction with identification means wherein these means are used to provide a printed record.

Another and further object of this invention is the provision of a vending machine operable in conjunction with identification means including driven means for providing a record of the identification means, as well as of the article dispensed.

A further and still other object of this invention is the provision of an article vending machine operable in conjunction with identification means adapted to dispense a selected article and wherein a printed record of the identification means and of the selected article is issued to the person using the machine and a copy of the printed record is maintained also within the machine.

Further and still other objects of this invention will be apparent from the following description taken in conjunction with the accompanying drawings in which:

FIGURE 1 is a view at the front panel as seen by a person using the machine;

FIGURE 2 is a vertical view partly in section along lines 2—2 of FIGURE 1;

FIGURE 3 is a view partly in section along lines 3—3 in FIGURE 2;

FIGURE 7 is a schematic electrical circuit diagram for the vending machine disclosed in FIGURES 1 through 6.

Figure 4:
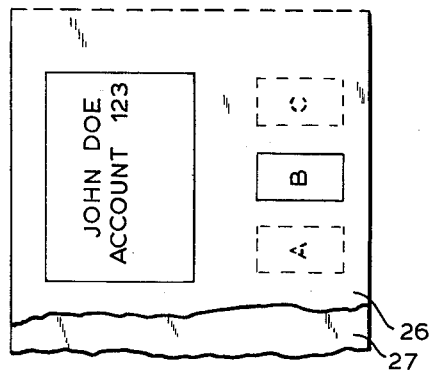
FIGURE 4 is a plan view showing a typical printed record.

Referring now to the figures and FIGURE 1 in particular, numeral 11 identifies the front panel of the instant article vending machine which is equipped with control 12, positionable to settings A, B, or C, respectively, for selecting the desired merchandise to be released. Directly below control 12 there is disposed a start-push button 13 used to initiate operation of the vending machine. On the right side of the panel there is aperture 14 for inserting suitable pass or identification means which will render the machine operable. Aperture 15 ejects a printed record for the person using the machine and aperture 16 is connected to a chute through which the identification means is returned. Merchandise vended is released via opening 17.

Figure 6:
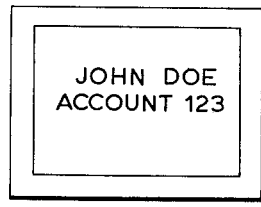
FIGURE 6 is a plan view of a typical pass or identification means used for operating the instant apparatus.

FIGURE 6 depicts an identification means 21 which serves as a pass means for rendering the vending machine operable. This identification means in a preferred embodiment is a credit card type plate, metal or plastic, with embossed information thereon (name, account number, etc.) and, if desired, with notched or embossed coding as widely known in connection with commercially available charge or credit cards. Obviously the identification means may assume other configurations.

Card 21 is inserted via aperture 14 into the apparatus and will come to rest against an upstanding stop plate 22, see FIGURE 2. Attached to stop plate 22 there is a sensing switch 23 which establishes the presence of the identification means as will be described later. The identification means is supported also underneath by a plate 24 which is attached to a solenoid and plunger combination 25. Above the identification means 21 there is disposed a set of superposed paper strips 26 and 27 which are either interleaved with carbon paper or suitably coated so that upon application of pressure the information applied to one sheet is transferred also to the other. When the solenoid of the combination 25, supported by bracket 31, is energized momentarily, the plunger and attached plate 24 are raised and forced against stamp table 32 thereby causing the embossed portions of the identification means 21 to imprint their markings upon paper strips 26 and 27. Paper strip 27 is issued via aperture 15 to the user of the vending machine for his records whereas strip 26 remains within the machine for accounting purposes. Suitable rollers 33 and 34 cooperate with paper strips 26 and 27 in a manner that is well known in the art of business machines and cash registers. A reciprocating knife or a serrated edge to sever strip 27 may be provided at aperture 15.

When identification means has served for the purpose of providing a record, solenoid 35 is energized to trip latch 36 thereby rotating the shelf-like plate 37 clockwise about pivot 38 and causing identification plate 21 to drop by gravity into chute 41 to effect its return via aperture 16 to the person using the machine.

FIGURE 3 shows some further details of the construction indicated in FIGURE 2. In addition to solenoid and plunger combination 25 there is a further array of printing solenoids, such as the single solenoid 42 of the array visible in FIGURE 3 which becomes selectively energized to provide a record of the type of article released. A typical receipt is shown in FIGURE 4 wherein the receipt shows an imprint accomplished by the identification means and an imprint "B" identifying the selected article of merchandise vended. If another article of merchandise would have been selected by control 12, either an "A" or "C" imprint would be visible. Obviously, there are provided as many stamps as there are different articles of merchandise. The receipt, in this manner not only indicates the name and account number, but provides also a record of the dispensed merchandise.

In order to return the shelf-like plate 37 and solenoid and plunger combinations 25, 42, etc., to their normal positions after identification means 21 has been dropped into chute 41, a rotary type solenoid 43 engages plate 37 via suitable bracket means. When rotary solenoid 43 is energized, plate 37 rotates about pivotal axis 38 to assume its previous position. The plate then is retained again by latch 36.

Figure 5:
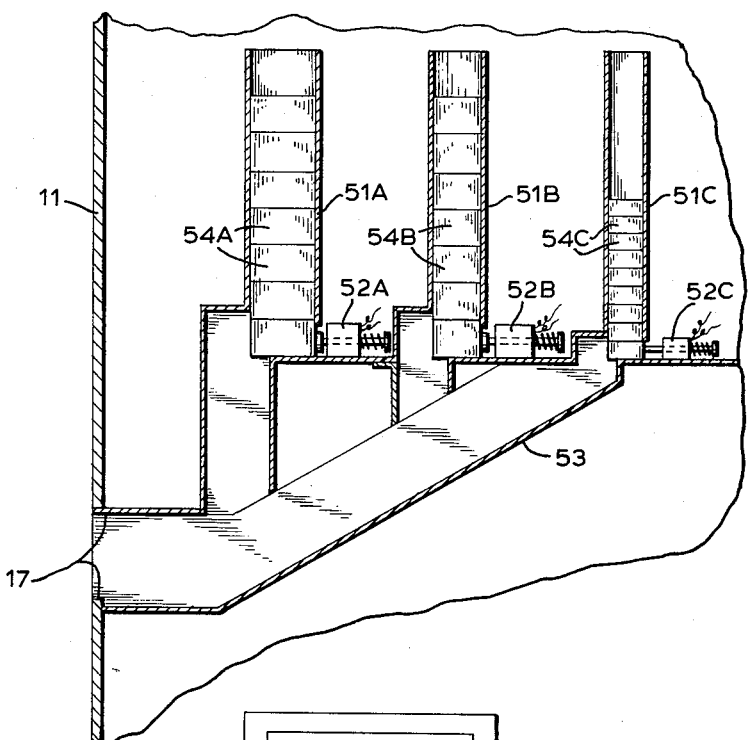
FIGURE 5 is a vertical sectional view along lines 5—5 in FIGURE 1.

The article storage and vending arrangement is shown more clearly in FIGURE 5. A set of three hoppers 51A, 51B and 51C contains suitable articles of merchandise 54A, 54B and 54C, each hopper being associated with one type of article. These articles are stacked in vertical direction in the usual arrangement. On the bottom of each hopper there is disposed a solenoid and plunger combination 52A, 52B and 52C, respectively. Each of these plunger and solenoid combinations coacts with the respective lowermost article so that when one of the respective solenoids is energized, the associated plunger moves forward and dislodges the lowermost article, this article being caused to fall by gravity into chute 53 from where it is guided toward opening 17. The article then may be removed from the machine.

A schematic electrical circuit diagram for operating the foregoing apparatus is shown in FIGURE 7. This diagram includes an electric motor 61 which is coupled to a gear reducer 62 to drive a series of timing cams 63 through 68.

When the pass or identification means 21, inserted into aperture 14, comes to rest against stop plate 22, sensing switch 23 is closed and upon momentarily depressing start push button 13, motor 61 becomes energized from line voltage. The rotation of motor 61 is transmitted via gear reducer 62 to timing cam 63 which immediately closes its associated switch 70 to provide a bypass circuit for start push button 13. By virtue of timing cam 63 the apparatus will go through one complete cycle. A brief period thereafter, cam 64 momentarily closes switch 71 to energize printing solenoid 25 to cause an imprint of the identification means on strips 26 and 27. Similarly, cam 65 shortly thereafter, or if desired simultaneously, closes switch 72 to cause actuation of the proper article record stamp 42, either "A," "B" or "C" as selected by suitable positioning of knob 12 on the front panel. Then, cam 66 closes the contact in switch 73 to energize the corresponding article ejector solenoid 52A, B or C, the selection thereof being responsive again to the position of control 12. Subsequently, switch 74 is closed by rotation of cam 67 to energize solenoid 35 thereby releasing the shelf-like plate 37 to return the identification means and, finally, cam 68 closes switch 75 to energize rotary solenoid 43 to return plate 37 to its normal position thereby resetting the apparatus.

It will be apparent that several modifications can readily be incorporated into the instant device some of which are as follows: Instead of the three hoppers shown there may be any number depending upon the type of the apparatus. Instead of individual printing solenoid and plunger combinations 42 a single peripherally embossed wheel may be used whose adjusted angular position is set responsive to the merchandise selected. Moreover, instead of impact printing means there may be used a pressure plate and a reciprocating roller, the latter pressing successively portions of the identification means 21 into contact with the paper strips to effect a transfer of information from the embossed lettering.

Another modification comprises the provision of a photographic record rather than the use of an imprinted record. Such a photographic arrangement is disclosed, for instance, in copending application for U.S. Letters Patent, Serial No. 772,204, filed November 6, 1958, entitled "Receipt Giving Machine," now abandoned.

A further modification concerns the provision of a window on the front panel behind which record strips 26 and 27 are exposed in order that the user of the machine can affix his signature before strip 26 winds itself upon roller 34.

While there has been described an embodiment of the present invention, together with several modifications, it will be understood by those skilled in the art that various other and further changes may be made therein without deviating from the intent and spirit of the invention which shall be limited only by the scope of the appended claims.

What is claimed is:

1. An article vending machine operable in conjunction with identification means and including means for providing a record thereof comprising: receiving means cooperatively associated with the machine for receiving from the depositor a substantially flat identification means having embossings on at least one of its surfaces; said receiving means being so constructed that when the identification means is inserted in said receiving means, the identification means until being released again from engagement with the machine is no longer accessible to the depositor; locating means disposed for causing said identification means after being received by said receiving means to become temporarily located at a printing position in said machine; a plurality of hoppers in said machine adapted to support for selective dispensing therefrom a corresponding plurality of kinds of articles, each kind of article having a predetermined value and being disposed in an associated hopper; manually operable control means accessible to the depositor for selecting the desired kind of article; a plurality of printing means whereby each printing means is associated with a respective kind of article; said printing means adapted to be actuated in a manner to indicate which kind of article has been selected; dispensing means coacting with said hoppers for causing upon energizing thereof, dispensing of the selected kind of article; means for causing energizing of said printing means responsive to the operation of said control means whereby to indicate the kind of article selected and dispensed from said hoppers; a recording medium; means for bringing the embossing of said identification means and the printing means into engagement with said recording medium to imprint thereupon and in associated relation with one another data transferred thereto respectively from said identification means and said printing means; means issuing an imprinted portion of said recording medium from said machine whereby to provide the depositor with a receipt; means for releasing said identification means from engagement with the machine and return to the depositor; timed control means for causing cyclic actuation of said printing means, energizing of said article dispensing means, operation of said means for bringing into engagement, and operation of said means releasing said identification means, and further control means causing said timed control means to be operable in response to the receipt of said identification means in said receiving means.

2. An article vending machine operable in conjunction with identification means and including means for providing a record thereof comprising: an enclosure; receiving means disposed in said enclosure for receiving from the depositor a substantially flat identification means having embossings on at least one of its surfaces; said receiving means being so constructed that when the identification means is inserted in said receiving means, the identification means until being released again from engagement with the machine is no longer accessible to the depositor; locating means disposed inside the enclosure for causing said identification means after being received by said receiving means to become temporarily located at a printing position in said enclosure; a plurality of hoppers in said enclosure adapted to support for selective dispensing therefrom a corresponding plurality of kinds of articles, each kind of article having a predetermined value and being disposed in an associated hopper; manually operable control means accessible from the exterior of the enclosure for selecting the desired kind of article; a plurality of printing means disposed in the enclosure whereby each printing means is associated with a respective kind of article; said printing means adapted to be actuated in a manner to indicate which kind of article has been selected; dispensing means coacting with said hoppers for causing upon energizing thereof, dispensing of the selected kind of article to a position accessible from the exterior of the enclosure; means for causing energizing of said printing means responsive to the operation of said control means whereby to indicate the kind of article selected and dispensed from said hoppers; a recording medium disposed in the enclosure; means for bringing the embossing of said identification means and the printing means into engagement with said recording medium to imprint thereupon and in associated relation with one another data transferred thereto respectively from said identification means and said printing means; means issuing an imprinted portion of said recording medium from said enclosure whereby to provide the depositor with a receipt; means for releasing said identification means from engagement with the machine and return to the depositor; timed control means connected for causing cycic actuation of said printing means, energizing of said article dispensing means, operation of said means for bringing into engagement, and operation of said means releasing said identification means, and further control means causing said timed control means to be operable in response to the receipt of said identification means by said receiving means.

3. An article vending machine as set forth in claim 2 wherein said recording medium is a strip of paper.

References Cited in the file of this patent

UNITED STATES PATENTS

| | | |
|---|---|---|
| 543,755 | Savorgnan | July 30, 1895 |
| 1,485,099 | Wahl | Feb. 26, 1924 |
| 1,682,827 | Brand | Sept. 4, 1928 |
| 1,852,733 | Brown | Apr. 5, 1932 |
| 1,979,613 | Goggins | Nov. 6, 1934 |
| 2,276,111 | Spears | Mar. 10, 1942 |
| 2,374,537 | Goldsmith | Apr. 24, 1945 |
| 2,520,952 | Mozel | Sept. 5, 1950 |
| 2,554,296 | Crews | May 22, 1951 |
| 2,792,148 | Goldenberg | May 14, 1957 |
| 2,906,070 | Schecter | Sept. 29, 1959 |